(12) United States Patent
Ball et al.

(10) Patent No.: US 8,676,941 B2
(45) Date of Patent: Mar. 18, 2014

(54) USING WIRELESS TECHNOLOGY TO DIRECT COMPLEX WIRING CONFIGURATIONS

(75) Inventors: Daniel G. Ball, Winchester (GB); Colin R. Jewell, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 13/286,680

(22) Filed: Nov. 1, 2011

(65) Prior Publication Data
US 2012/0110147 A1 May 3, 2012

(30) Foreign Application Priority Data
Nov. 2, 2010 (EP) .................................... 10189719

(51) Int. Cl.
*G06F 15/177* (2006.01)
*H04L 29/06* (2006.01)
*H04L 29/08* (2006.01)

(52) U.S. Cl.
CPC .............. *H04L 65/102* (2013.01); *H04L 67/00* (2013.01)
USPC ........ 709/220; 709/224; 370/395.3; 370/503; 370/412; 370/507

(58) Field of Classification Search
CPC ............................... H04L 65/102; H04L 67/00
USPC ...................................................... 709/220
See application file for complete search history.

(56) References Cited

U.S. PATENT DOCUMENTS 6,636,518 B1 * 10/2003 Liencres .................... 370/395.7
7,589,624 B2    9/2009 Hatakeyama 2001/0029534 A1 * 10/2001 Spinks et al. ................. 709/224
2006/0106577 A1 *  5/2006 Hatakeyama ................. 702/183
2007/0027948 A1    2/2007 David
2007/0118568 A1 *  5/2007 Kitani et al. ................. 707/200

OTHER PUBLICATIONS

"Blade Center Wireless Communication System", IPCOM000185092D PriorArtDatabase, www.ip.com Jul. 10, 2009, 3 pages.
"Handheld Dockable Wireless Device for Managing Multiple Blade Enclosures", IPCOM000160809D PriorArtDatabase, www.ip.com Nov. 29, 2007, 7 pages.
"Handheld-based creation of hardware group for problem troubleshooting", IPCOM000188472D PriorArtDatabase, www.ip.com Oct. 9, 2009, 4 pages.
"Method and System to locate virtual machine in a datacenter environment", IPCOM000175766D PriorArtDatabase, www.ip.com Oct. 24, 2008, 15 pages.

* cited by examiner

*Primary Examiner* — Krista Zele
*Assistant Examiner* — Arvin Eskandarnia
(74) *Attorney, Agent, or Firm* — DeLizio Gilliam, PLLC

(57) ABSTRACT

A network comprises at least one network device and a plurality of unconnected network ports, the apparatus comprising: a send component for sending an identification message to each network device; a receive component, responsive to the send component sending the identification message, for receiving at least one identification response from the network; an analyze component, responsive to the receive component receiving an identification response, for determining the plurality of unconnected network ports comprising a first network port; an identify component, responsive to the analyze component determining the plurality of unconnected network ports, for determining the first network port; and a send component, responsive to the identify component determining the first network port, operable for sending a first location message to the first network port.

9 Claims, 5 Drawing Sheets

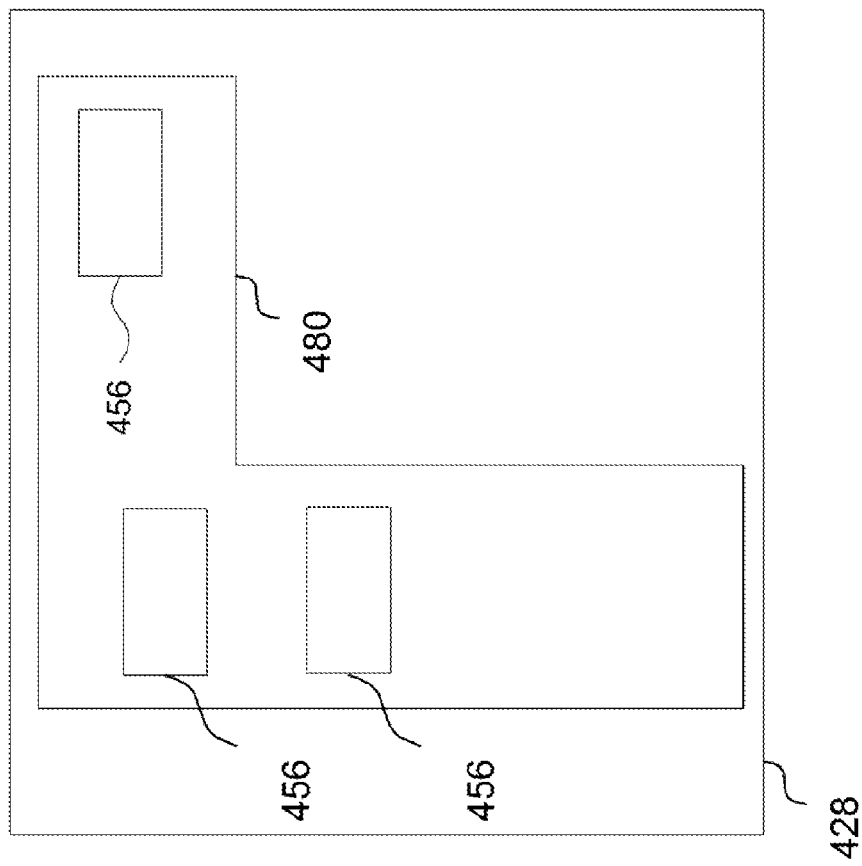
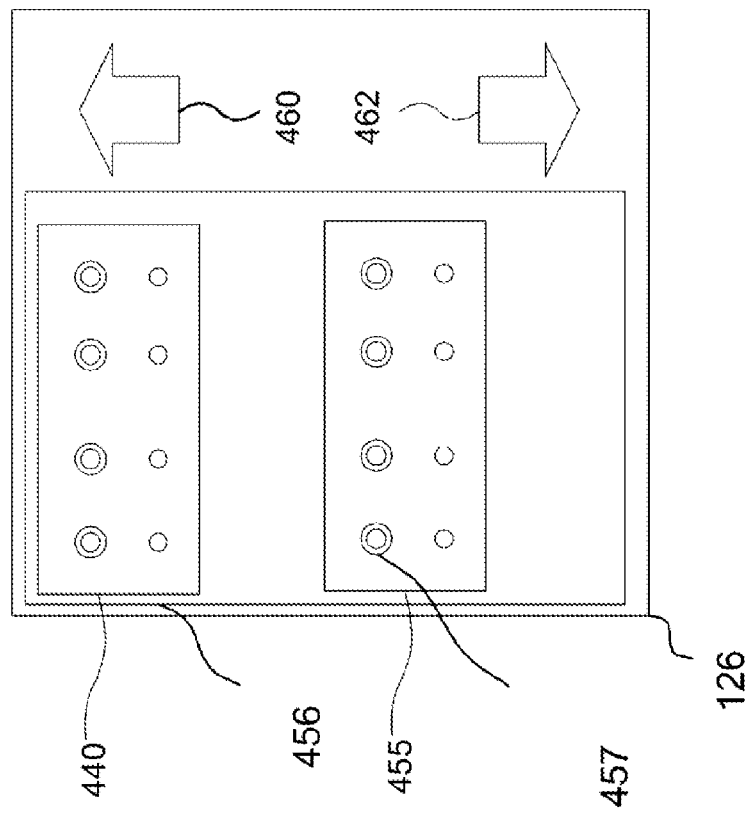
FIG. 4

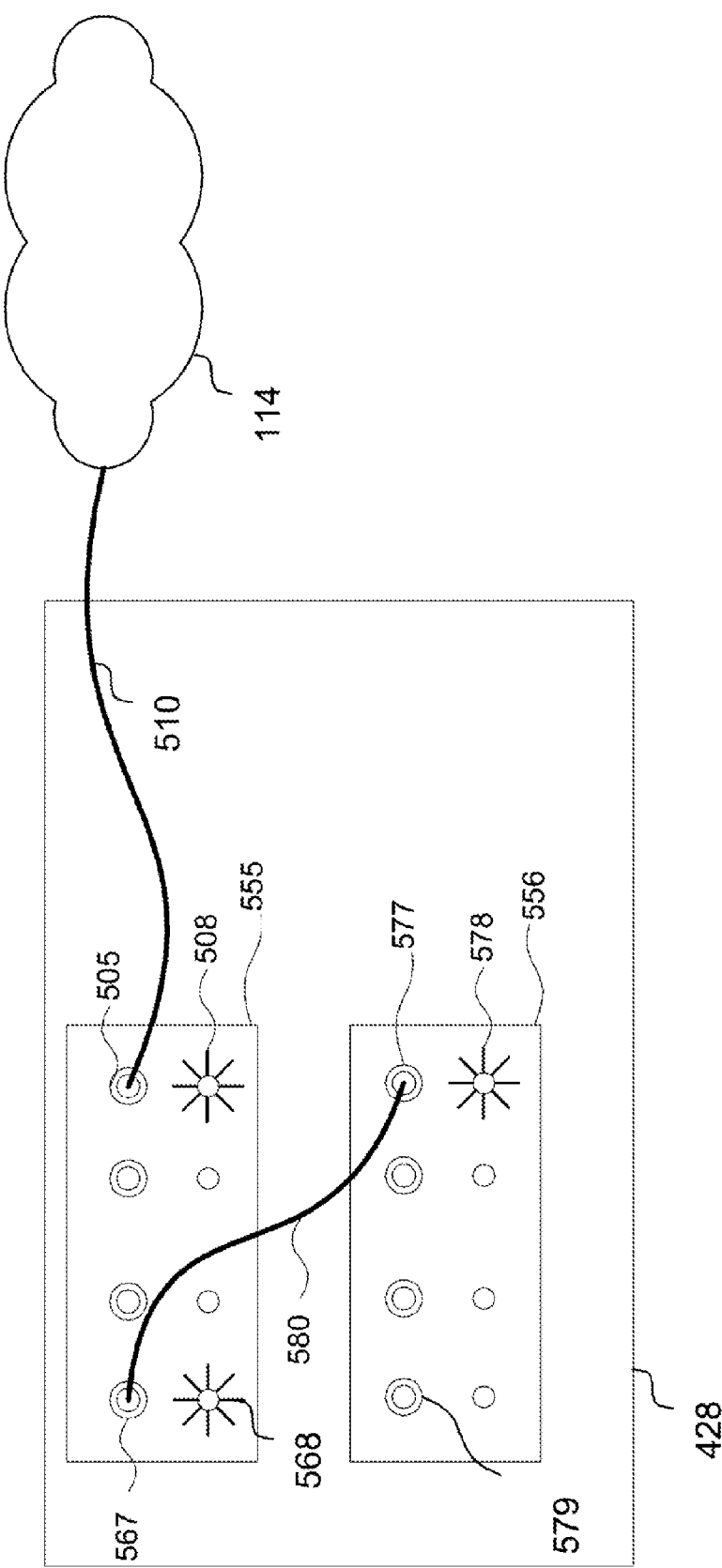

USING WIRELESS TECHNOLOGY TO DIRECT COMPLEX WIRING CONFIGURATIONS

RELATED APPLICATIONS

This application claims the benefit of priority of European Patent Application No. 10189719.7 filed Nov. 2, 2010.

BACKGROUND

Embodiments of the present invention relate to computer networks. In particular, embodiments of the present invention relate to an apparatus, method and computer program for connecting elements of a computer network together.

Connecting two computer network devices with data cabling correctly is difficult, as the network devices could be in any location and the wiring could be physically connected to more than one port on the network devices.

These problems are particularly prevalent on rack mounted storage enclosures connected via Serial Attached Small Computer System Interface (SAS) or Fibre Channel cabling, where the storage enclosures could be in any position on the enclosure rack, could have multiple identical external ports, and could have been originally physically wired incorrectly.

It is possible to wire up a set of enclosures incorrectly and use the connection available to determine in what way they are mis-configured. However, this is not always possible if the mis-wiring prevents exploratory gathering of connection data. Expanders cannot access the outside world through external Internet Protocol (IP) links, if the links are not wired or configured yet. Even if mis-wiring does allow for some correct gathering of system layout, it requires the system to be intelligent enough to make use of an incorrect set-up.

Software on a computer device could visually instruct and check the wiring of one or more server-room based machines. Usually, such automated checking is done through the wiring itself. This does not work if the wiring is either not connected or is mis-configured.

SUMMARY

Embodiments of the present inventive subject matter provide for processes, machines, and computer program product articles of manufacture for managing a computer network. According to one embodiment, an apparatus is provided for use in connection with a network comprising at least one network device and a plurality of unconnected network ports. The described apparatus comprises a send component for sending an identification message to each network device, a receive component, responsive to the send component sending the identification message, for receiving at least one identification response from the network, an analyze component, responsive to the receive component receiving an identification response, for determining the plurality of unconnected network ports comprising a first network port, and an identify component, responsive to the analyze component determining the plurality of unconnected network ports, for identifying the first network port. In the described embodiment, the send component, responsive to the identify component identifying the first network port, is further operable for sending a first location message to the first network port.

BRIEF DESCRIPTION OF THE DRAWINGS

The present embodiments may be better understood, and numerous features, and advantages made apparent to those skilled in the art by referencing the accompanying drawings.

The present invention will now be described, by way of example only, with reference to preferred embodiments, as illustrated in the following figures:

FIG. 4 is a block diagram depicting images displayed in a window on a display screen of the handheld device, in accordance with an embodiment of the present invention; and FIG. 5 is a block diagram of cabling between the network and two storage enclosures, in accordance with an embodiment of the present invention.

DETAILED DESCRIPTION

Figure 1:
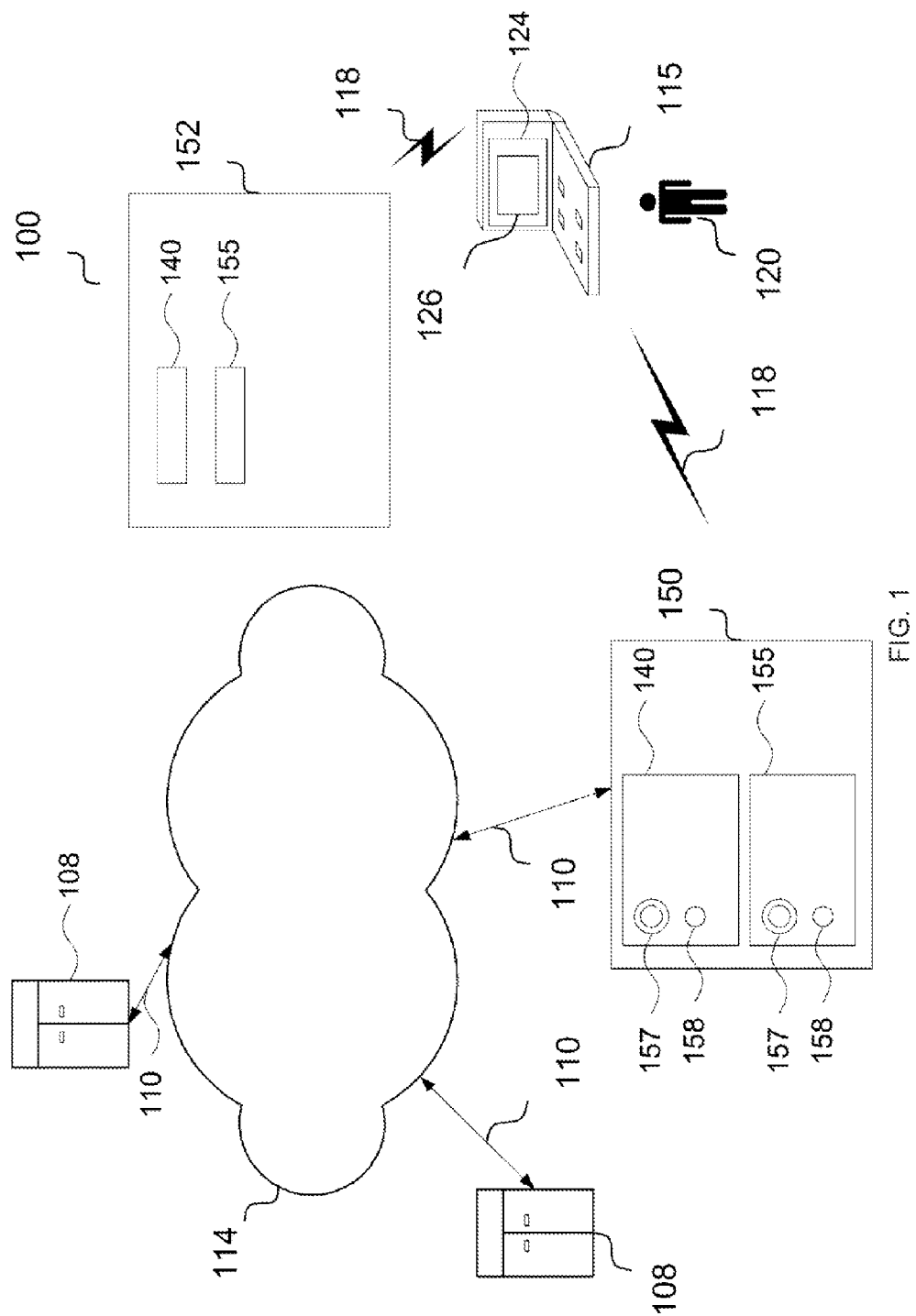
FIG. 1 is a block diagram depicting a computer system, in accordance with the prior art, and in which an embodiment of the present invention may be implemented.

Viewed from a first aspect, embodiments of the present invention provide an apparatus for managing a computer network, the network comprising at least one network device and a plurality of unconnected network ports, the apparatus comprising: a send component for sending an identification message to each network device; a receive component, responsive to the send component sending the identification message, for receiving at least one identification response from the network; an analyze component, responsive to the receive component receiving an identification response, for determining the plurality of unconnected network ports comprising a first network port; an identify component, responsive to the analyze component determining the plurality of unconnected network ports, for identifying the first network port; and the send component, responsive to the configure component identifying the first network port, further operable for sending a first location message to the first network port.

In another embodiment of the present invention the receive component, responsive to the send component sending the first location message, is further operable for receiving a first location response from the first network port.

In another embodiment of the present the apparatus further comprises a display component, responsive to the receive component receiving the first location response, for displaying a first location of the first network port.

In another embodiment of the present invention the apparatus further comprises a check component, responsive to the first network port being connected to a second network port, for checking a connection between the first network port and the second network port.

In another embodiment of the present invention the apparatus further comprises a configure component, responsive to the first network port being connected to a second network port, for configuring a connection between the first network port and the second network port.

In another embodiment of the present the send component is further operable for sending one of the identification message and the first location wirelessly.

Viewed from a second aspect, embodiments of the present invention provide a method for managing a computer network, the network comprising at least one network device and a plurality of unconnected network ports, the method comprising: sending an identification message to each network device; in response to sending the identification message, receiving at least one identification response from the network; in response to receiving an identification response, determining the plurality of unconnected network ports comprising a first network port; in response to determining the plurality of unconnected network ports, for identifying the first network port; and in response to identifying the first network port, sending a first location message to the first network port.

In another embodiment of the present invention the method further comprises, in response to sending the first location message, receiving a first location response from the first network port.

In another embodiment of the present invention the method further comprises, in response to receiving the first location response, displaying a first location of the first network port.

In another embodiment of the present invention the method further comprises, in response to the first network port being connected to a second network port, checking a connection between the first network port and the second network port.

In another embodiment of the present invention the method further comprises, in response to the first network port being connected to a second network port, configuring a connection between the first network port and the second network port.

In another embodiment of the present invention sending one of the identification message and the first location comprises sending one of the identification message and the first location wirelessly.

Viewed from a third aspect, embodiments of the present invention provide a computer program stored on a computer readable medium and loadable into the internal memory of a digital computer, comprising software code portions, when said program is run on a computer, for performing one or more methods as previously described.

Advantageously, a wireless data connection, such as Bluetooth or wi-fi, is used to instruct and determine the correct set up of complex wiring. The apparatus detects and reports on any supported server room machine that is switched on, but not connected or configured via any data cabling to anything else in the server room. Machines which are not yet configured are selected as a fully configured operational server should not be exposed as a security risk by enabling a wireless connection.

Embodiments of the present invention provide a method and apparatus to identify physical hardware.

According to one or more embodiments of the present invention, each machine is displayed as an image on a wireless device. The visual arrangement of the machines displayed on the configuration software is appropriate to the way they are stored in the server room; for example, a rack containing a rack mounted device would appear visually as a set of boxes stacked on-top of one another.

According to one or more embodiments of the present invention, if all of the cabling has been connected, but is still not working, error recovery is used to identify and access ports associated with the failing connections without the need for redundant cabling.

One or more embodiments of the present invention provide a method/apparatus that does not require a storage controller to be accessed, cabled, or configured in order to cable and configure expansion storage enclosures. Connections are made without referring to whether the connected components are peers, or have a hierarchical relationship.

FIG. 1 is a block diagram depicting a computer system 100 in which an embodiment of the present invention may be implemented. Computer system 100 comprises networked computer devices, for example, but not restricted to: servers 108; storage enclosures 140, 155; a first enclosure rack 150; a second enclosure rack 152; and, a workstation 115. Both first enclosure rack 150 and second enclosure rack 152 comprise at least one storage enclosure 140, 155. Typically, a storage enclosure 140, 155 comprises either a storage controller 140 or a storage expansion box 155. First enclosure rack 150 is wired to network 114, but is not configured. Second enclosure rack 152 is not wired to the network. The computer devices are connectable through a network 114, which may comprise a wired network 110 or a wireless network (not shown). An example of a network is the Internet. Workstation 115 comprises a handheld device in one embodiment, such as a phone or a personal digital assistant (PDA). The handheld device may also be connected to computer devices through an alternative wireless network 118, for example through a Wi-Fi, Bluetooth or other wireless short distance connection protocol. Storage enclosures 140, 155 also comprise network ports 157, with which to attach to network 114 and to each other. An indicator 158 is associated with each network port 157. The indicator could be a light-emitting diode (LED).

Figure 2:
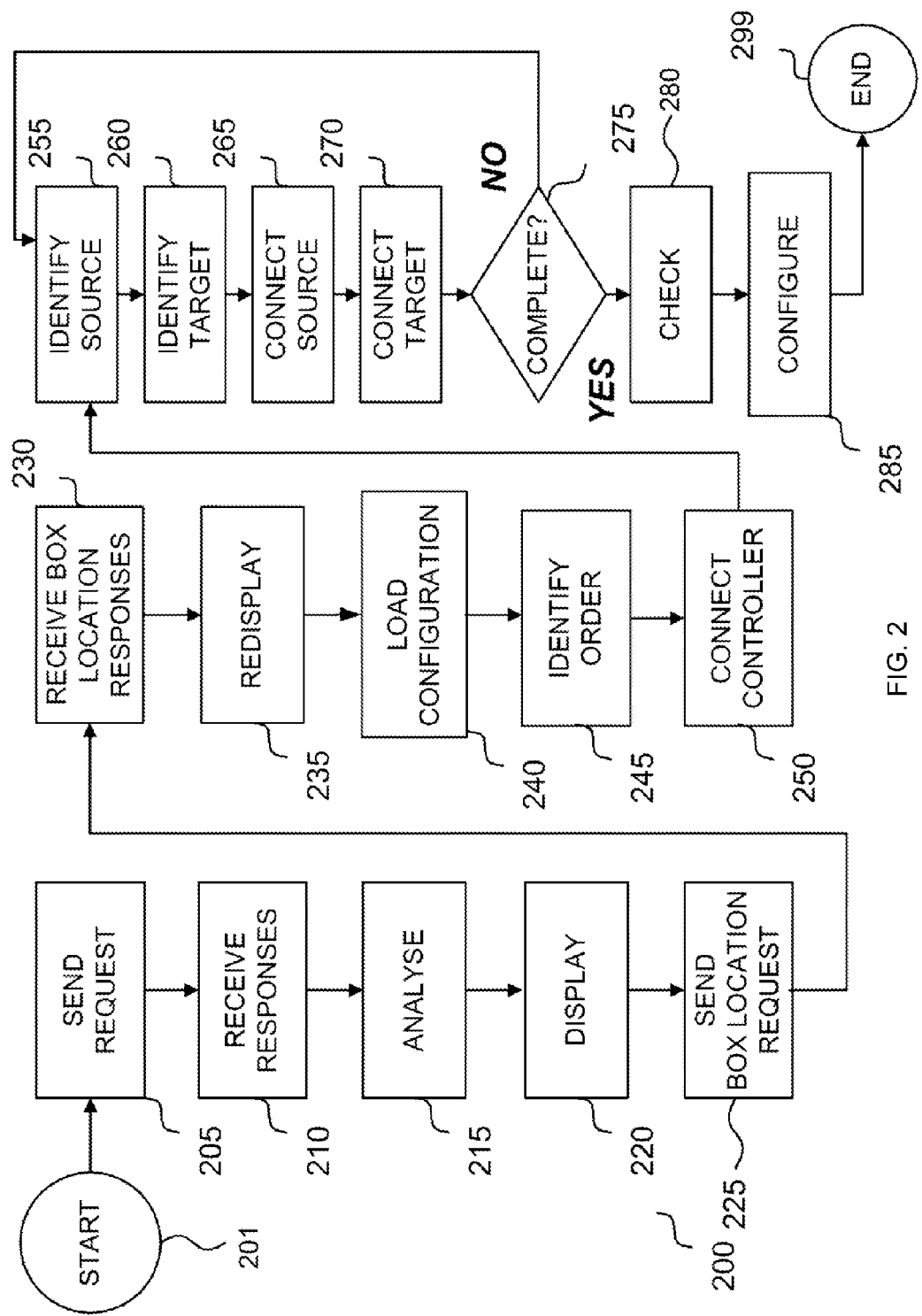
FIG. 2 is a high-level schematic flow diagram depicting operation method steps for managing the connections of a computer device network, in accordance with an embodiment of the present invention.
Figure 3:
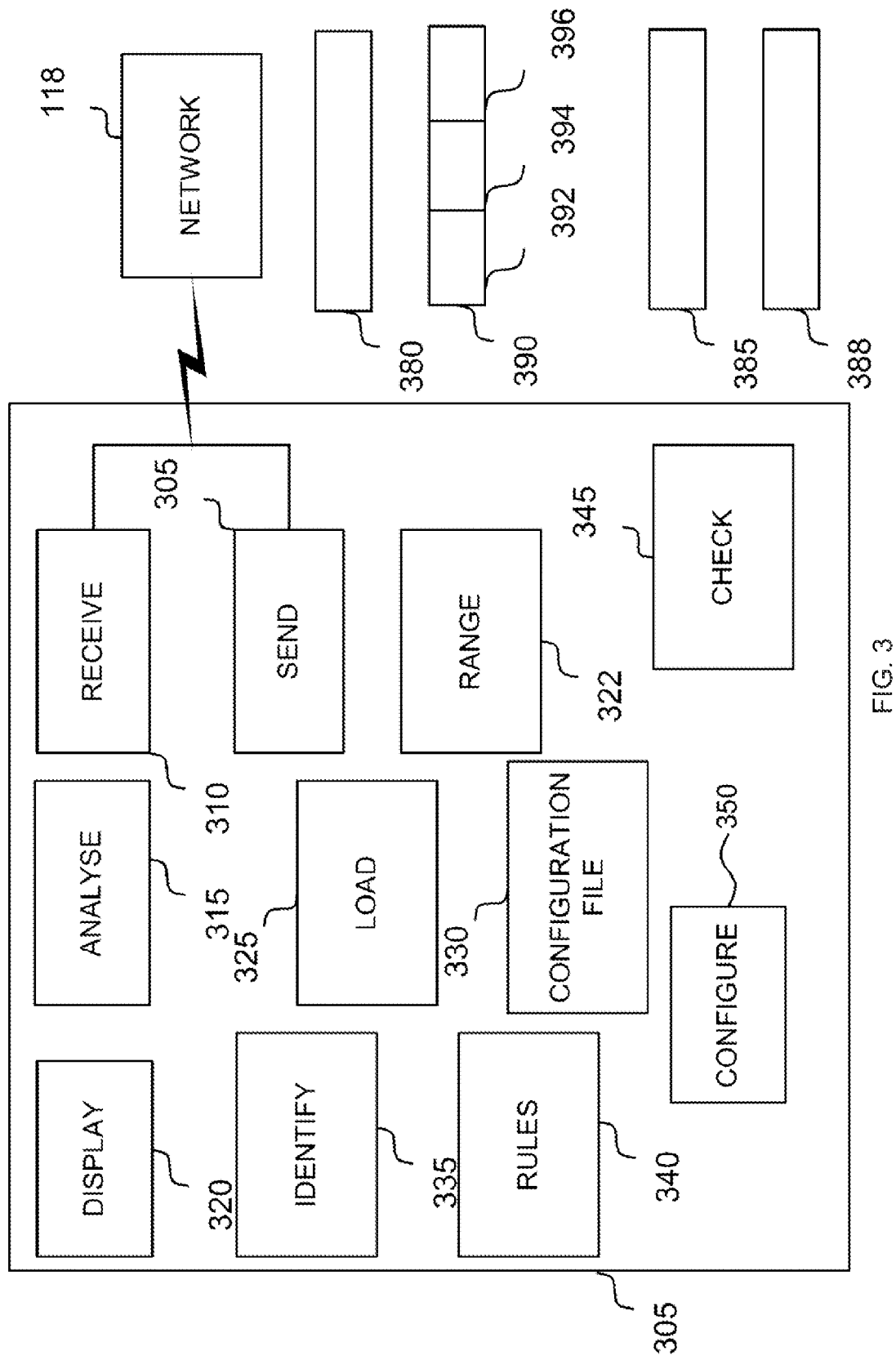
FIG. 3 is a block diagram depicting an apparatus operable on a workstation for managing the connections of the computer device network, in accordance with an embodiment of the present invention.

FIG. 2, which should be read in conjunction with FIGS. 3-5, is a high-level schematic flow diagram depicting method operations for managing connections of a computer system 100, in accordance with an embodiment of the present invention. FIG. 3 is a block diagram depicting an apparatus 305 operable on a handheld device such as workstation 115 for managing the connections of computer system 100, in accordance with an embodiment of the present invention. FIG. 4 is a block diagram depicting images displayed in a graphical user interface (GUI) window 126 on a display screen 124 of the handheld device 115, in accordance with an embodiment of the present invention. FIG. 5 is a block diagram of example cabling between network 114 and two storage enclosures 555, 556, in accordance with an embodiment of the present invention.

FIG. 2 is set forth as a logical flow chart diagram. As such, the depicted order and labeled operations are indicative of one embodiment of the presented method. Other operations and methods may be conceived that are equivalent in function, logic, or effect of one or more operations or portions thereof, of the illustrated method. Additionally the format and symbols employed are provided to explain the logical operations of the method and are understood not to limit the scope of the method.

In one embodiment of the present invention, unconfigured storage enclosures 140, 155 are used as an example of computer network devices that are to be managed. However, in alternative embodiments other computer network devices could be managed instead.

According to the illustrated embodiment, the depicted method starts (process block 201). A send component 305 sends an identification message 380 to each of the storage enclosures 140, 155 using a wireless data connection 118, such as Wi-Fi IEEE 802.11 or Bluetooth to instruct the storage enclosures 140, 155 to identify themselves (process block 205). Each of storage enclosures 140, 155 comprises a wireless network interface card that is set up to allow a single ad-hoc peer-to-peer connection using a secure protocol, for example, Wi-Fi Protected Access. Apparatus 305 comprises a copy of a security key to enable it to connect to the enclosure.

Once connected over wireless connection 118, a storage enclosure 140, 155 sends a reply message 390 back to apparatus 305 to identify itself to apparatus 305. A receive component 310 receives the reply message 390 (process block 210). Reply message 390 comprises three pieces of information in the illustrated embodiment: a model number 392 identifies storage enclosure 140, 155 as supported hardware; a unique identification (ID) 394 that is set at manufacture time;

and, further information 396 about storage enclosure 140, 155. The described unique ID is analogous to a Media Access Control address (MAC address) or World Wide Node Name (WWNN). The actual WWNN of the device could even be used in the place of ID 394 if appropriate to the networking protocol of storage enclosure 140, 155. ID 394 allows client software to identify each storage enclosure 140, 155 and will be the basis on which to build up a graphical representation of supported storage enclosures 140, 155. Further information 396 comprises additional information about storage enclosure 140, 155, for example, identification for each of the storage enclosure's network ports 157, and whether the ports of storage enclosure 140, 155 are already cabled or configured.

A receive component 310 receives reply message 390 from each of storage enclosures 140, 155 within range of network connection 118 (process block 210). An analyze component 315 analyzes each of reply messages 390 to determine the storage enclosures and the unconnected network ports that are present within range of computer system 100 (process block 215).

A display component 320 displays an enclosure image 455 of each of storage enclosures 140, 155, an associated enclosure rack image 456, and, a port image 457 of unconnected network ports 157 in a graphical user interface (GUI) window 126 on display screen 124 of workstation 115 (process block 220). Manipulation icons 460, 462 are also displayed. A user 120 of workstation 115 can manipulate displayed images 455, 456 in GUI 126 using manipulation icons 460, 462 so that the positions of images 455, 457 are more intuitive. For example, user 120 may prefer to arrange images 455 to match the physical location of storage enclosures 140, 155 in enclosure rack 150, 152. To do this, user 120 would select image 455 and move it up or down enclosure rack image 456 with manipulation icons 460, 462.

Send component 305 sends a locate message 385 to each of identified storage enclosures 140, 155 in turn to locate storage enclosure 140, 155 physically (process block 225). Storage enclosure 140, 155 sends a locate reply message 390 back to apparatus 305 to identify its location to apparatus 305 (process block 230). Receive component 310 receives locate reply message 388 from each of storage enclosures 140, 155 within range of network connection 118. A range component 322 calculates the location of storage enclosure 140, 155 by analyzing how long locate reply message 390 took to be received back after locate message 385 was sent. In an alternative embodiment, locate reply message 390 comprises location information manually supplied for storage enclosure 140, 155. In another embodiment, a storage enclosure 140, 155 identifies itself, via LED 158 being instructed to flash by storage enclosures 140, 155. The location is subsequently either noted manually, or located automatically, for example by using global positioning system (GPS) sensing by workstation 115.

In the illustrated embodiment, display component 320 displays images 440, 455, 456, 457 for each of storage enclosures 140, 155, enclosure racks 150, 152, and network ports 157 in a location GUI window 428 on display screen 124 of workstation 115 (process block 235). Location GUI window 428 displays images 440, 455, 456, 457 in their physical location relative to each other in an image 480. In the example embodiment, images 440, 455, 456, 457 are depicted in an L-shaped room in which they are located, so that user 120 can physically locate them easily.

A load component 325 loads a configuration file 330, and a rules file 340 (process block 240). Configuration file 330 comprises data about which ports 157 should be connected to each other. Rules file 340 comprises ordering rules for port configuration.

In one embodiment, example ordering rules comprise the following order:
1. Connect external connection to storage controller.
2. Connect closely located ports.
3. Connect ports in adjacently located storage enclosures.
4. Finish connecting as many of the ports of a storage controller or storage enclosure as possible before starting the connections of the ports of a further storage enclosure.
5. Work around the enclosure racks in an order to minimize the distance travelled by the user.

One skilled in the art will appreciate that other ordering rules are contemplated by alternative embodiments of the present invention. Similarly, in other embodiments ordering rules are not utilized. In one embodiment, external connection to a storage controller only occurs after other connections have been made.

An identify component 335 evaluates configuration file 330 for identified ports 157 to determine a suitable connection order for ports 157 using rules file 340 (process block 245).

Send component 305 sends a controller port identification signal (not shown) to a first external controller port 505 in a first storage controller 140, 555 (process block 250) as identified by identify component 335 (process block 245). First external controller port 505 identifies itself by flashing its LED 158, 508. User 120 connects a free end of external network connector cable 510 to first storage controller port 505.

Send component 305 sends a source port identification signal (not shown) to a first source port 567 (process block 255) as identified by identify component 335 (process block 245). First source port 567 identifies itself by flashing its LED 158, 568. First source port 567 is disposed in a storage expansion box 155 according to one embodiment. Send component 305 sends a target port identification signal (not shown) to a first target port 577 in a second storage enclosure 140, 155, 556 (process block 260) as identified by identify component 335 (process block 245). First target port 577 identifies itself by flashing its LED 578. First target port 577 is disposed in the same storage enclosure (e.g., storage enclosure 140, 155, 555) as first source port 567 in one embodiment, in the illustrated embodiment depicted in FIG. 5 however, first target port 577 and first source port 567 are each disposed in a different storage enclosure 140, 155, 556. User 120 connects one end of a suitable cable 580 to first source port 567 (process block 265). User 120 connects the other end of cable 580 to first target port 567 (process block 270).

In the illustrated process embodiment, apparatus 305 determines whether all identified connections have been processed (process block 275). If more connections are to be processed, the depicted method embodiment loops back to send a source port identification signal via send component 305 (process block 255). If no more connections are to be processed the depicted process embodiment continues (process block 280).

Once user 120 believes that each cable 510, 580 has been correctly connected, a check component 345 interrogates connected storage enclosures 140, 155 wirelessly to ensure that the connection has been made (process block 280). Check component 345 notifies user 120 that the connection between ports 567, 577 has been made correctly. If user 120 has plugged cable 510, 580 into a wrong port 579, check component 345 also informs user 120 of the error. This process is repeated until check component 345 determines that computer system 100 is correctly wired. At this point, in the illustrated embodiment, apparatus 305 uses data cabling 110, 114 for further configuration and the finding of any faults. In an alternative embodiment, apparatus 305 continues to wirelessly communicate to storage enclosures 140, 155 for further configuration and for fault determination.

In the depicted process embodiment, a configure component 350 communicates with computer network 110, 114 via a server 108 (process block 285). Configure component 350 initiates a configuration command, which results in configuration of the connections made in the illustrated method 200. Once configuration is complete, check component 345 connects to network 114, and sends a control signal that traverses each of connected ports 505, 567, 577 to check that the configuration as stipulated in configuration file 330 has been configured correctly.

FIG. 5 depicts LEDs 508, 568, 578 identifying themselves at different times during a performance of the method previously described herein. An LED 508 of external network port 505 identifies itself (process block 250). An LED 568 of first source network port 567 identifies itself (process block 255). An LED 578 of first target network port 577 identifies itself (process block 260). The illustrated method ends following configuration (process block 299).

In an alternative embodiment, enclosure racks 150, 152 are in communication with storage enclosures 140, 155 contained within. A send component 305 sends an identification message 380 to each of enclosure racks 150, 152. Enclosure racks 150, 152 gather information from storage enclosures 140, 155, and then send a complex reply message (not shown) back to apparatus 305. The complex reply message comprises information 392, 394 for all of enclosure racks 150, 152 contained within enclosure rack 150, 152. On receipt, apparatus 305 decomposes the complex reply message into individual reply messages 390 for analysis.

In an alternative embodiment, storage controller 140 is cabled and configured after first source port 567 is cabled and configured to first target port 568 (process block 250). Connections are made without referring to whether the connected components are peers, or have a hierarchical relationship.

In one embodiment, a storage controller 140 does not need to be accessed, cabled, or configured, in order to cable and configure the expansion storage enclosures. In an alternative embodiment, apparatus 305 wirelessly communicates to storage enclosures 140, 155 to configure the links, and to test the configuration by sending suitable Input/Output signals through ports 567, 577.

In another embodiment, wireless connectivity of a storage enclosure 140, 155 is enabled whenever the cabling is not connecting storage enclosure 140, 155 in such a way as storage enclosure 140, 155 has access to external resources through an alternative network. When a new storage enclosure 140, 155 is to be added to an existing configuration, a wireless connection is enabled. Once new storage enclosure 140, 155 is cabled and configured, its wireless connectivity is disabled. If a storage enclosure 140, 155 of a production computer system 100 is completely detached from the cabled network, then its wireless connectivity is enabled.

Various aspects are described herein with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The computer program instructions may also be loaded onto a computer, other programmable data processing apparatus, or other devices to cause a series of operations to be performed on the computer, other programmable apparatus or other devices to produce a computer implemented process such that the instructions that the programmable apparatus provide are processed for implementing the functions/acts specified in the flowchart and/or block diagram block or blocks.

As will be appreciated by one skilled in the art, aspects of embodiments the present invention may be embodied as a system, method, computer program product or computer program. Accordingly, such aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of embodiments of the present invention may take the form of a computer program product or a computer program embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

For the avoidance of doubt, the term "comprising", as used herein throughout the description and claims is not to be construed as meaning "consisting only of".

What is claimed is:

1. An apparatus for managing a computer network the apparatus comprising:
   a processor;
   a wireless network interface; and
   a computer-readable storage medium having program instructions stored therein, the program instructions executable by the processor to cause the apparatus to,
   send an identification message via the wireless network interface to each of the plurality of network devices;
   determine identifying information from response messages sent from the plurality of network devices that respond to the identification messages, wherein the identifying information for each responding network device at least includes a unique identifier for the network device and identification of each unconnected network port of the network devices;
   send via the wireless network interface, a location message to each of the plurality of network devices;
   determine approximate physical location of each of the plurality of network devices with respect to the apparatus based on responses to the location messages;
   update a graphical user interface to depict the approximate physical locations of the plurality of network devices;
   load connection configuration data for the computer network, wherein the connection configuration data indicates wired connections to make among the unconnected network ports of the network devices and ordering rules for making the wired connections; and
   send signals to activate visual indicators, each of which correspond to a different one of the unconnected network ports, in accordance with the connection configuration data.

2. The apparatus of claim 1, wherein the program instructions further comprises program instructions executable by the processor to cause the apparatus to update the graphical user interface based on the identifying information to depict the plurality of network devices before the graphical user interface is updated to depict the approximate physical locations of the plurality of network devices.

3. The apparatus of claim 1, wherein the program instructions further comprises program instructions executable by the processor to cause the apparatus to check the wired connections after the signals are sent to activate the visual indicators.

4. A method for managing a computer network, the method comprising:
   wirelessly sending an identification message to each of a plurality of network devices;
   determining identifying information from response messages sent from the plurality of network devices that respond to the identification messages, wherein the identifying information for each responding network device at least includes a unique identifier for the network device and identification of each unconnected network ports of the network devices;
   wirelessly sending a location message to each of the plurality of network devices that responded to the identification message
   determining approximate physical location of each of the plurality of network devices based on responses to the location messages;
   updating a graphical user interface to depict the approximate physical locations of the plurality of network devices;
   loading connection configuration data for the computer network, wherein the connection configuration data indicates wired connections to make among the unconnected network ports of the network devices and ordering rules for making the wired connections; and
   sending signals to activate visual indicators, each of which correspond to a different one of the unconnected network ports, in accordance with the connection configuration data.

5. The method of claim 4, wherein the method further comprises updating the graphical user interface based on the identifying information to depict the plurality of network devices before the graphical user interface is updated to depict the approximate physical locations of the plurality of network devices.

6. The method of claim 4, wherein the method further comprises checking the wired connections after sending the signals to activate the visual indicators.

7. A computer program product for managing a computer network, the computer program product comprising:
   a non-transitory computer readable storage medium having computer readable program code embodied therewith, the computer readable program code executable by a machine, the computer readable program code comprising computer readable program code,
   wirelessly send an identification message to each of a plurality of network devices;
   determine identifying information from response messages sent from the plurality of network devices that respond to the identification messages, wherein the identifying information for each responding network device at least includes a unique identifier for the network device and identification of each unconnected network port of the network devices;
   wirelessly send a location message to each of the plurality of network devices that responded to the identification message
   determine approximate physical location of each of the plurality of network devices based on responses to the location messages;
   update a graphical user interface to depict the approximate physical locations of the plurality of network devices;
   load connection configuration data for the computer network, wherein the connection configuration data indicates wired connections to make among the unconnected network ports of the network devices and ordering rules for making the wired connections; and send signals to activate visual indicators, each of which correspond to a different one of the unconnected network ports, in accordance with the connection configuration data.

8. The computer program product of claim 7, wherein the computer readable program code further comprises computer readable program code to update the graphical user interface based on the identifying information to depict the plurality of network devices before the graphical user interface is updated to depict the approximate physical locations of the plurality of network devices.

9. The computer program product of claim 7, wherein the computer readable program code further comprises computer readable program code to check the wired connections after the signals have been sent to activate the visual indicators.

* * * * *